United States Patent [19]
Puckett et al.

[11] Patent Number: 5,409,779
[45] Date of Patent: Apr. 25, 1995

[54] SHIELD FOR WATER AND SOUND

[75] Inventors: Richard H. Puckett, Centerline; Drew S. Behm; Donald P. Marriott, both of Rochester Hills, all of Mich.

[73] Assignee: Cadillac Products, Inc., Troy, Mich.

[21] Appl. No.: 160,375

[22] Filed: Nov. 30, 1993

Related U.S. Application Data

[63] Continuation of Ser. No. 652,021, Feb. 7, 1991, abandoned.

[51] Int. Cl.6 .................... B32B 1/00; B32B 27/00
[52] U.S. Cl. .................... 428/500; 428/174; 428/515; 428/516; 428/519; 428/521
[58] Field of Search .......... 428/156, 167, 174, 178, 428/192, 402, 500, 515, 516, 519, 521, 688, 913; 524/426, 427, 423; 525/240, 232

[56] References Cited

U.S. PATENT DOCUMENTS

| | | | |
|---|---|---|---|
| 3,526,000 | 8/1970 | Williams | 156/82 |
| 4,613,643 | 9/1986 | Nakamura et al. | 524/426 |
| 4,728,692 | 3/1988 | Sezaki et al. | 525/211 |
| 4,801,651 | 1/1989 | Fomatsu et al. | 525/211 |
| 4,824,409 | 4/1989 | Kagawa | 156/244.24 |
| 4,824,499 | 4/1989 | Kagawa | 156/85 |
| 4,871,796 | 10/1989 | Fomatsu et al. | 525/211 |
| 4,906,683 | 3/1990 | Fonatsu et al. | 525/194 |
| 4,957,968 | 9/1990 | Adur et al. | 525/194 |
| 4,968,464 | 11/1990 | Kojoh et al. | 264/290.2 |

Primary Examiner—Donald J. Loney
Attorney, Agent, or Firm—Harness, Dickey & Pierce

[57] ABSTRACT

A composite high density plastic sheet, comprising a thermoplastic elastomer filled in substantial amount with an inorganic material, and intimately blended with a high strength low density polyethylene whereby to provide in one product the benefits of sound attenuation as well as inhibiting water and dust entry. The sheet can be cold-formed to include a pocket portion for use in applications such as receiving vehicle apparatus. Provision of a separate layer of the low density polyethylene assists in the sheets being stacked and adhesive permits the sheet to be removably attached to a surface of the apparatus.

13 Claims, 1 Drawing Sheet

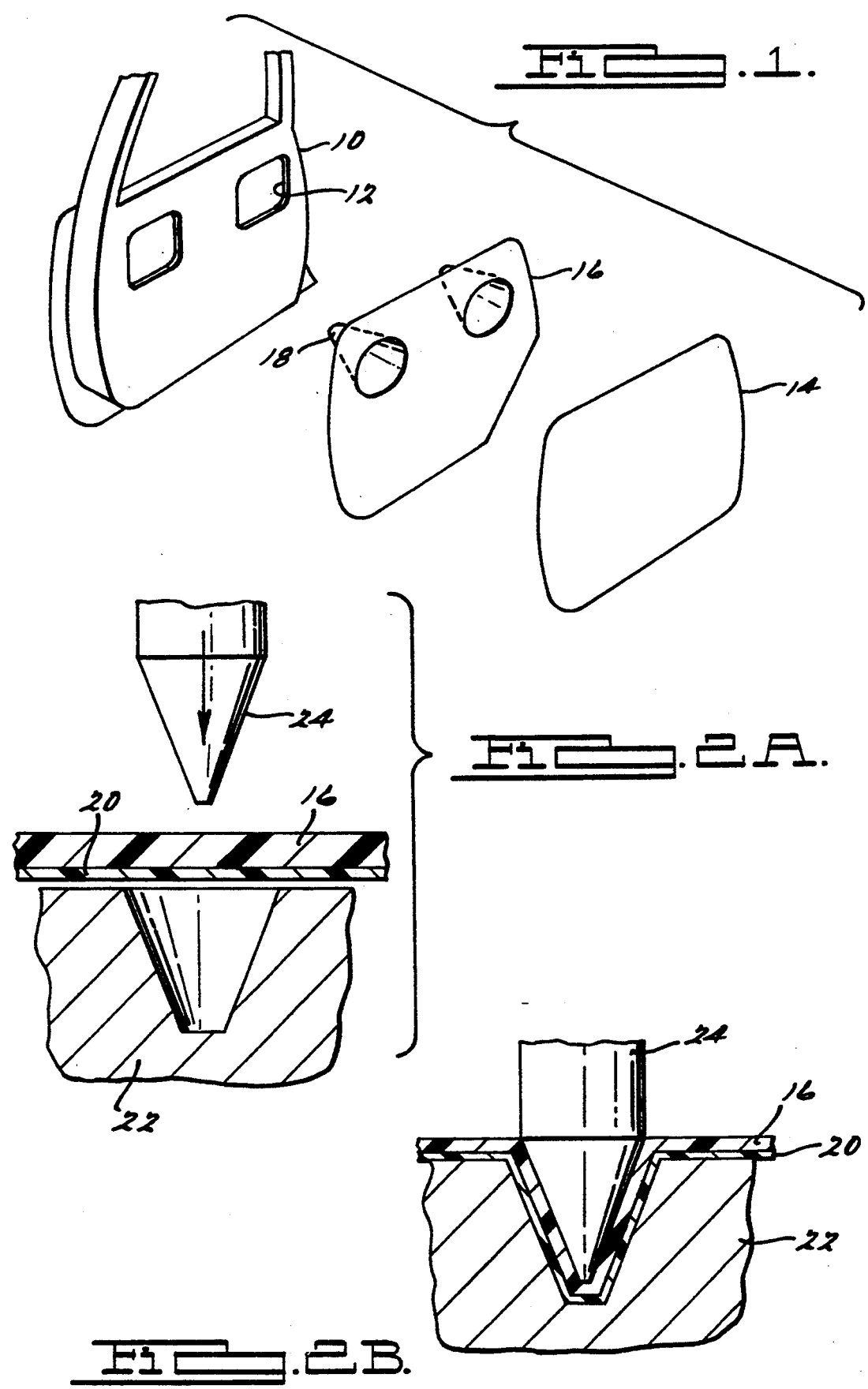

SHIELD FOR WATER AND SOUND

This is a continuation of U.S. patent application Ser. No. 07/652,021, filed Feb. 7, 1991 now abandoned.

BACKGROUND OF THE INVENTION

This invention is directed to a composite, high density plastic sheet material used in the manufacture of a water, dust, wind, air and sound barrier and method of making same. The invention is particularly suited for use in the manufacture of automotive vehicle door panels and will be described with reference thereto, however, as will become apparent, the invention is capable of broader application and could equally well be used as a lightweight sound barrier shield or vibration dampener.

It is known that surface protectors or deflectors are particularly suited for shielding the inner panels of vehicles against the infiltration of water or dust. In general, the deflectors comprise a thin, flexible sheet of a plastic material having a peripheral shape to overlie a predetermined portion of the inner door sheet metal. Typically, the deflectors are joined to the door sheet metal by pressure sensitive adhesive applied in a band around the peripheral edge of the deflectors.

There has been an ongoing need for the flat deflectors to include bulges or pockets to allow them to adequately accommodate radio speakers, door panel clips and similar devices which extend inwardly or outwardly of the door from the inner panel. Typically, the sheet results from a thermoforming operation. These prior attempts have not been altogether successful, especially when the sheet must be cured, stacked, and provided with the adhesive.

Further, the plastic deflectors have not been altogether satisfactory in preventing noise transmission (e.g., tire noises).

The subject invention provides a structure and method of forming the same which overcome the above-noted problems and others in an economical manner.

SUMMARY OF THE INVENTION

In accordance with the subject invention, a suitable barrier against water, sound, dust and air comprises a mixture of an inorganically filled thermoplastic elastomer intimately blended with a suitable polyethylene, such as those characterized as being a low density polyethylene (LDPE), or a linear low density polyethylene (LLDPE), or an ultra-low density polyethylene (ULDPE). In accordance with one aspect of this invention, the barrier is cold-formed to include a bulge or pocket like area. In accordance with another aspect of this invention, the barrier is formed (e.g., laminated) to include a separate layer of a low surface energy polymer, such as the low density polyethylene, or treated with silicone release coating, whereby the barriers can be stacked for dispensing. In accordance with yet another aspect of the invention, the barrier can form a deflector against sound and water.

Advantageously, the barrier can be formed by single extrusion or coextrusion processes that are known in the art and thus allowing the user to utilize known forming techniques and apparatus.

A further advantage is provision in one product the sound, water, dust, air, wind, ease of installation, and cost benefits.

A further advantage is provision of a composite sheet which is not only flexible but also somewhat limp, whereby to deaden sound transmission loss in both the low as well as the high frequency ranges. Although the composite sheet is relatively flexible, it is still sufficiently rigid to function as a barrier but the limp nature of the sheet minimizes vibration of its own thereby preventing harmonic vibration such as that caused by speakers.

A further advantage is provision of a barrier of the type described having a plurality of pockets or bulges for use in vehicle door panels wherein the user utilizes the bulges to position the barrier on the door during installation.

Advantageously, the bulge can be cold-formed whereby post curing difficulties are obviated. Desirably so, such as where the bulge is somewhat cone-shaped, the material thickness can be maintained of generally uniform thickness and does not tend to have thinned regions of reduced strength.

The above and other advantages of the invention will become apparent to those skilled in the art upon a reading and understanding of the following description.

BRIEF DESCRIPTION OF THE DRAWINGS

FIG. 1 is a perspective view showing a barrier of the present invention for application to an automotive vehicle door.

FIGS. 2(A) and 2(B) are cross-section views showing the cold-forming of a pocket in the barrier of FIG. 1.

DETAILED DESCRIPTION OF THE PREFERRED EMBODIMENT

Turning now to the drawings, a barrier according to the present invention for inhibiting passage of water, sound, air and dirt will be described with respect to its application to a vehicle door.

In FIG. 1, a vehicle door is comprised of an outer metallic door frame 10 having a plurality of spaced openings 12, an inner trim panel 14 sized to fit onto and be secured to the frame, and a barrier 16 cold-formed to include a plurality of bulges or pockets 18. The arrangement and shape of the frame, panel and barrier would change, according to the vehicle model.

Barrier 16 is illustrated as comprising a generally thin planar sheet comprised of a thermoplastic elastomer filled with a substantial amount of an inert or inorganic material intimately blended with a suitable low density polyethylene (LDPE), including those plastics characterized as being a linear low density polyethylene (LLDPE), or an ultra-low density polyethylene (ULDPE). The thermoplastic elastomer comprises between 80% to 98% and preferably about 95% and the polyethylene comprises between 2% to 20% and preferably about 5%, by weight. The thickness of the sheet is minimized and the flexibility maximized by the inorganic filler content comprising at least 50% to about 79% of the thermoplastic elastomer, by weight, and preferably 76%, and the inorganic filler consisting essentially of calcium carbonate and barium sulfate. Sound deadening benefits are achieved by the above-subject thermoplastic elastomer. The water, wind, air and dust benefits are achieved through the ability of the low density polyethylene to impart flexibility, high tear strength and stretch characteristics to the sheet. A decrease in tear strength of the barrier results when the polyethylene approaches the lower end of its range. One suitable thermoplastic elastomer is Keldex ® 6868, a trademark of DuPont, and one suitable low density polyethylene is Attane®, a trademark of the Dow Chemical Co While those skilled in the art will recognize that the sheet could have different thicknesses, for the intended purposes, it has been found that a thickness in the range of approximately 20 mils is preferable. Sound attenuation is directly proportional to the basis of the weight of the sheet. Preferably, a preferred weight basis is in the range of 0.15 to 0.30 lb. per sq. ft. Lighter weight basis sheets are suitable for some uses but for proportionally lower sound attenuation.

In accordance with this invention, a layer 20 of the low density polyethylene (e.g., Attane®) can be formed on one surface of the sheet. Many methods are possible, such as lamination, coextrusion or extrusion coating. These methods would be known to those skilled in the art.

In one embodiment, the composite barrier 16 was about 20 mils thick, and the layer 20 was about 2 mils, making the total sheet thickness about 22 mils. The cone 18 was about 2 inches in diameter and height. The density of the thermoplastic elastomer was about 2.07 gm/cubic centimeters. The density of the polyethylene was in the range of about 0.890 to 0.93 gm/cubic centimeters, and preferably about 0.901 gm/cubic centimeters.

Referring to FIGS. 2(A) and 2(B), the pockets or forms are shown being formed by a cold-forming drawing operation although other conventional techniques could be utilized, such as vacuum forming. FIG. 1 shows the general configuration of a preferred pocket 18 as being cone-shaped. In the drawing operation, cooperating interengaging die members 22 and 24 are moved together with the composite sheet comprising barrier 16 and layer 18 positioned therebetween. The die members are then moved toward one another to produce localized stretching and permanent deformation of the sheet. The pocket 18 can advantageously be formed in the sheet while the sheet is at or near room temperature and without the use of thermoforming equipment. The process allows conventional presses to be used for both pocket forming and sheet cutting. The choice of materials allows the pocket to form without memory and tearing, due to the high tear and elongation properties of the composition materials. The pocket is collapsible to lie essentially in the plane of the sheet and extendable in a direction away from the sheet.

Additionally, if desired, a plurality of barriers 16 can be die cut and stacked without the use of a carrier or a release sheet. In this regard, relative ease of release between parts can be achieved through the use of a silicone release coating, or the coextrusion of a low surface energy polymer on one side. A preferred silicone release coating is General Electric UV 9300, a 100% solid, ultraviolet cure coating, at a surface deposition of less than 1 gm/sq. m. A preferred low energy polymer is the above-mentioned Attane®, applied at a surface layer thickness of 1 to 3 mils, using standard lamination, coextrusion or extrusion techniques.

In operation, the highly filled thermoplastic elastomer (e.g., Keldex®) and low density polyethylene (e.g., Attane®) are mixed together in an extruder, intimately blended, formed into a sheet, and wound on a roll. If desired, the layer 20 of polyethylene could be formed simultaneously. This sheet material is then calendered to smooth out roughness. If desired, the sheet could be unwound, whereby to receive the silicone layer, and a desired adhesive pattern, and then cured. The cone can be formed by passing the sheet between the interengaging dies. Thereupon the cone-formed sheet could be rewound and sent to a die cutting machine. There the sheets would be cut, stacked, and die cut into a desired configuration, such as barrier 16. It should be understood that some steps could be substantially simultaneous, such as die cutting and cone forming and die cutting and sheet forming. The sheet could be formed to include a plurality of pockets, depending on the vehicle door. The pockets assist the user in assembly by supporting the sheet on the door.

Additionally, the single sheet without pockets could be used to advantage in non-automotive applications. The inorganically filled thermoplastic elastomer adds needed mass, which assists in deadening sound. While the sound attenuation (i.e., sound transmission loss) improves at the higher frequencies (i.e., short wavelengths), benefits are gained at the low frequencies (i.e., long wavelengths), such as tire noise.

The composition of barrier 16 provides a limp elastic structure, as opposed to a thin sheet of a single plastic material, that assists in deadening sound. As such, the barrier can be applied to a metal plate as a vibration dampener or used as a sound barrier.

While the above description constitutes the preferred embodiment(s) of the invention, it will be appreciated that the invention is susceptible to modification, variation, and change without departing from the proper scope or fair meaning of the accompanying claims.

What is claimed is:

1. A barrier for shielding against the infiltration of water, air and sound, said barrier comprising a sheet of a thickness and composition effective for imparting sound deadening qualities to said barrier, said composition consisting essentially of from about 2% to about 20% of polyethylene selected from the group consisting of low density polyethylene, linear low density polyethylene, ultra low density polyethylene, and mixtures thereof intimately blended with from about 80% to about 98% of a thermoplastic elastomer substantially filled with from about 50% to about 95% of an inorganic filler.

2. The invention as recited in claim 1 wherein the elastomer is approximately 95% and the polyethylene is approximately 5%, by weight.

3. The invention as recited in claim 1 wherein the elastomer has a weight basis in the range of 0.15 to 0.30 lb/sq. ft.

4. The invention as recited in claim 1 wherein the inorganic filler comprises between 50% and 79% of the thermoplastic elastomer.

5. The invention as recited in claim 1 wherein the inorganic filler comprises approximately 76% of the thermoplastic elastomer.

6. The invention as recited in claim 1 wherein the inorganic filler consists essentially of calcium carbonate and barium sulfate.

7. The invention as recited in claim 1, wherein said barrier further comprises a thin planar sheet having first and second surfaces and an edge of desired configuration, and further comprising a layer of low density polyethylene being formed on one said surface.

8. The invention as recited in claim 1, wherein said barrier further comprises a thin planar sheet having first and second surfaces and further comprising a release agent bonded on one said surface.

9. The invention as recited in claim 1, wherein said barrier further comprises a thin planar sheet having first and second surfaces and further comprising a low surface energy polymer coextruded on one said surface.

10. The invention as recited in claim 1, wherein said barrier further comprises a thin planar sheet having first and second surfaces and further comprising at least one pocket being cold-formed therein, said pocket being collapsible to lie essentially in the plane of the sheet and extendable in a direction away from one surface of said barrier.

11. The invention as recited in claim 1 wherein said polyethylene is a low density polyethylene.

12. The invention as claimed in claim 1 wherein said polyethylene comprises from about 2% to about 20% of said composition.

13. The invention as claimed in claim 1 wherein said thermoplastic elastomer comprises from about 80% to about 98% of said composition.

* * * * *